(12) United States Patent
Yoshinari et al.

(10) Patent No.: US 11,597,878 B2
(45) Date of Patent: *Mar. 7, 2023

(54) METHOD FOR PRODUCING RARE EARTH ALUMINATE FLUORESCENT MATERIAL, RARE EARTH ALUMINATE FLUORESCENT MATERIAL, AND LIGHT EMITTING DEVICE

(71) Applicant: NICHIA CORPORATION, Anan (JP)

(72) Inventors: Atsushi Yoshinari, Tokushima (JP); Shoji Hosokawa, Tokushima (JP)

(73) Assignee: NICHIA CORPORATION, Anan (JP)

(*) Notice: Subject to any disclaimer, the term of this patent is extended or adjusted under 35 U.S.C. 154(b) by 458 days.

This patent is subject to a terminal disclaimer.

(21) Appl. No.: 16/718,437

(22) Filed: Dec. 18, 2019

(65) Prior Publication Data

US 2020/0199447 A1 Jun. 25, 2020

(30) Foreign Application Priority Data

Dec. 20, 2018 (JP) .............................. JP2018-238756

(51) Int. Cl.
*C09K 11/77* (2006.01)
*H01L 33/50* (2010.01)
*G03B 21/20* (2006.01)

(52) U.S. Cl.
CPC ........ *C09K 11/7774* (2013.01); *G03B 21/204* (2013.01)

(58) Field of Classification Search
CPC .............. C09K 11/7774; C09K 11/025; C09K 11/7734; C09K 11/0838; C09K 11/7706;
(Continued)

(56) References Cited

U.S. PATENT DOCUMENTS 9,605,201 B2 3/2017 Yamaguchi
9,868,270 B2 1/2018 Irie
(Continued)

FOREIGN PATENT DOCUMENTS

CN 105062482 A * 11/2015
JP 2007089035 A 4/2007
(Continued)

OTHER PUBLICATIONS

Machine tranlsation of CN-105062482-A, 16 pages. (Year: 2015).*
(Continued)

*Primary Examiner* — Matthew E. Hoban
*Assistant Examiner* — Lynne Edmondson
(74) *Attorney, Agent, or Firm* — Hunton Andrews Kurth LLP

(57) ABSTRACT

A method for producing a rare earth aluminate fluorescent material, including: preparing, as raw materials, cerium oxide having a crystallite diameter in a range of 200 Å or more and 1,600 Å or less, a compound containing at least one kind of a rare earth element Ln selected from the group consisting of Y, La, Lu, Gd, and Tb, a compound containing Al, and depending on necessity a compound containing at least one kind of an element M1 selected from the group consisting of Ga and Sc, wherein a total molar ratio of the rare earth element Ln and cerium is 3, a total molar ratio of Al and the element M1 is a product of a parameter k in a range of 0.95 or more and 1.05 or less and 5, a molar ratio of cerium is a product of a parameter n in a range of 0.005 or more and 0.050 or less and 3, and a molar ratio of the element M1 is a product of a parameter m in a range of 0 or more and 0.02 or less, the parameter k, and 5; and subjecting a mixture of the raw materials to a heat treatment to provide a calcined product.

12 Claims, 4 Drawing Sheets

(58) Field of Classification Search
CPC ... C09K 11/7721; C04B 35/44; C04B 35/117; C04B 35/505; C04B 2235/5436; C04B 2235/3222; C04B 2235/5445; C04B 2235/3217; C04B 2235/3225; C04B 2235/764; C04B 2235/3224; C04B 2235/3229; C04B 2235/661; C04B 2235/3286; C04B 2235/786; C04B 2235/3227; C04B 2235/5454; H01L 33/502; H01L 33/50; G03B 21/204

See application file for complete search history.

(56) References Cited

U.S. PATENT DOCUMENTS

| | | | | |
|---|---|---|---|---|
| 11,220,632 | B2* | 1/2022 | Sunagawa | H05B 33/14 |
| 2010/0067233 | A1* | 3/2010 | Bechtel | H01L 25/0753 |
| | | | | 359/326 |
| 2012/0045634 | A1 | 2/2012 | Irie et al. | |
| 2015/0205189 | A1 | 7/2015 | Nojima | |
| 2015/0219291 | A1 | 8/2015 | Yamaguchi | |
| 2016/0091171 | A1* | 3/2016 | Okada | F21V 9/38 |
| | | | | 372/44.01 |
| 2020/0392401 | A1 | 12/2020 | Ito et al. | |

FOREIGN PATENT DOCUMENTS

| | | |
|---|---|---|
| JP | 2012017455 A | 1/2012 |
| JP | 2014234487 A | 12/2014 |
| JP | 2015113358 A | 6/2015 |
| JP | 2015138168 A | 7/2015 |
| JP | 2015149394 A | 8/2015 |
| JP | 2016204563 A | 12/2016 |
| WO | 2006097876 A1 | 9/2006 |
| WO | 2018154869 A1 | 8/2018 |

OTHER PUBLICATIONS

"Cozzan, C., et al. "Stable, Heat-Conducting Phospor Composites for High-Power Laser Lighting", (Feb. 5, 2018), vol. 10, No. 6, Applied Materials & Interfaces, p. 5673-5681, 10 pages.".

"Final Office Action, issued from the United States Patent and Trademark Office, to U.S. Appl. No. 16/374,244, dated Jul. 9, 2021, 6 pages.".

"Li, S., et al. "$Al_2O_3$—YAG:Ce composite phosphor ceramic: a thermally robust and efficient color converter for solid plate laser lighting", (Oct. 2019), vol. 4, No. 37, Journal of Materials Chemistry C, p. 8648-8654, 8 pages.".

Non-Final Office Action, issued from the United States Patent and Trademark Office, to U.S. Appl. No. 16/374,244, dated Mar. 26, 2021, 6 pages.

* cited by examiner

METHOD FOR PRODUCING RARE EARTH ALUMINATE FLUORESCENT MATERIAL, RARE EARTH ALUMINATE FLUORESCENT MATERIAL, AND LIGHT EMITTING DEVICE

CROSS-REFERENCE TO RELATED PATENT APPLICATION

This application claims priority to Japanese Patent Application No. 2018-238756, filed on Dec. 20, 2018, the disclosure of which is hereby incorporated reference in its entirety.

BACKGROUND

Technical Field

The present disclosure relates to a method for producing a rare earth aluminate fluorescent material, a rare earth aluminate fluorescent material, and a light emitting device.

Description of Related Art

A light emitting device containing a light emitting element, such as a light emitting diode (which may be hereinafter referred to as "LED") and a laser diode (which may be hereinafter referred to as "LD"), and a fluorescent material has been used as a light source. The light emitting device using LED or LD has been used in a wide variety of fields including a light emitting device for automobile use or indoor illumination, a backlight source of a liquid crystal display device, a light source device for illuminations or projectors. Known fluorescent materials used in the light emitting device include a rare earth aluminate fluorescent material that contains a rare earth metal element and has a garnet crystal structure. Known examples thereof include an yttrium aluminum garnet fluorescent material (which may be hereinafter referred to as a "YAG fluorescent material") containing yttrium and a lutetium aluminum garnet fluorescent material (which may be hereinafter referred to as a "LuAG fluorescent material") containing lutetium.

In the rare earth aluminate fluorescent materials, a rare earth aluminate fluorescent material that is activated with Ce emits light in yellow color to green color under excitation with irradiation of a corpuscular beam or an electromagnetic wave, such as an electron beam, a vacuum ultraviolet ray, or blue light. For example, Japanese Unexamined Patent Publication No. 2015-138168 describes the use of a rare earth aluminate fluorescent material activated with Ce in a light emitting device used for a light source for a projector.

SUMMARY

The size of the particles (particle diameter) of the fluorescent material is one of the factors that largely influence the light emission characteristics and the durability thereof. With a larger particle diameter of the fluorescent material, the light emission intensity thereof is often increased. For increasing the particle diameter of the rare earth aluminate fluorescent material, a method of accelerating the crystal growth of the fluorescent material may be considered. As the method of accelerating the crystal growth of the fluorescent material, a method of increasing the temperature for calcining the raw materials, a method of prolonging the calcining time, and a method of increasing the amount of the flux used in calcining may be exemplified. However, in the method of increasing the calcining temperature and the method of prolonging the calcining time, the crystal structure of the fluorescent material may be altered to cause the case where the fluorescent material having the target composition cannot be obtained and the case where the working efficiency is deteriorated in some cases although the fluorescent material obtained has a large particle diameter. Furthermore, in the method of increasing the amount of the flux, the flux may remain in the fluorescent material and may deteriorate the light emission intensity of the resulting fluorescent material in some cases although the fluorescent material obtained has a large particle diameter.

Under the circumstances, an object of one embodiment of the present disclosure is to provide a production method capable of providing a rare earth aluminate fluorescent material having a large particle diameter, a rare earth aluminate fluorescent material, and a light emitting device.

The present disclosure encompasses the following embodiments.

A first embodiment of the present disclosure relates to a method for producing a rare earth aluminate fluorescent material, including:

preparing, as raw materials, cerium oxide having a crystallite diameter in a range of 200 Å or more and 1,600 Å or less, a compound containing at least one kind of a rare earth element Ln selected from the group consisting of Y, La, Lu, Gd, and Tb, a compound containing Al, and depending on necessity a compound containing at least one kind of an element M1 selected from the group consisting of Ga and Sc, wherein a total molar ratio of the rare earth element Ln and cerium is 3, a total molar ratio of Al and the element M1 is a product of a parameter k in a range of 0.95 or more and 1.05 or less and 5, a molar ratio of cerium is a product of a parameter n in a range of 0.005 or more and 0.050 and 3, and a molar ratio of the element M1 is a product of a parameter m in a range of 0 or more and 0.02 or less, the parameter k, and 5; and subjecting a mixture of the raw materials to a heat treatment to provide a calcined product.

A second embodiment of the present disclosure relates to a rare earth aluminate fluorescent material having a composition containing at least one kind of a rare earth element Ln selected from the group consisting of Y, La, Lu, Gd, and Tb; Ce; Al; O; and depending on necessity at least one kind of an element M1 selected from the group consisting of Ga and Sc, wherein a total molar ratio of the rare earth element Ln and Ce is 3, a molar ratio of Ce is a product of a parameter n in a range of 0.005 or more and 0.050 or less and 3, a total molar ratio of Al and the element M1 is a product of a parameter k in a range of 0.95 or more and 1.05 or less and 5, a molar ratio of the element M1 is a product of a parameter m in a range of 0 or more and 0.02 or less, the parameter k, and 5, and a molar ratio of O is 12, in 1 mol of the composition, having an average particle diameter Db measured by a Fisher sub-sieve sizer method in a range of 22 μm or more and 50 μm or less, and having an average circle equivalent diameter De in a range of 26 μm or more and 45 μm or less.

A third embodiment of the present disclosure relates to a light emitting device including the aforementioned rare earth aluminate fluorescent material, and a light emitting element having a light emission peak wavelength in a range of 380 nm or more and 485 nm or less.

According to the embodiments of the present disclosure, a production method capable of providing a rare earth aluminate fluorescent material having a large particle diameter, a rare earth aluminate fluorescent material, and a light emitting device can be provided.

DETAILED DESCRIPTION

Figure 1:
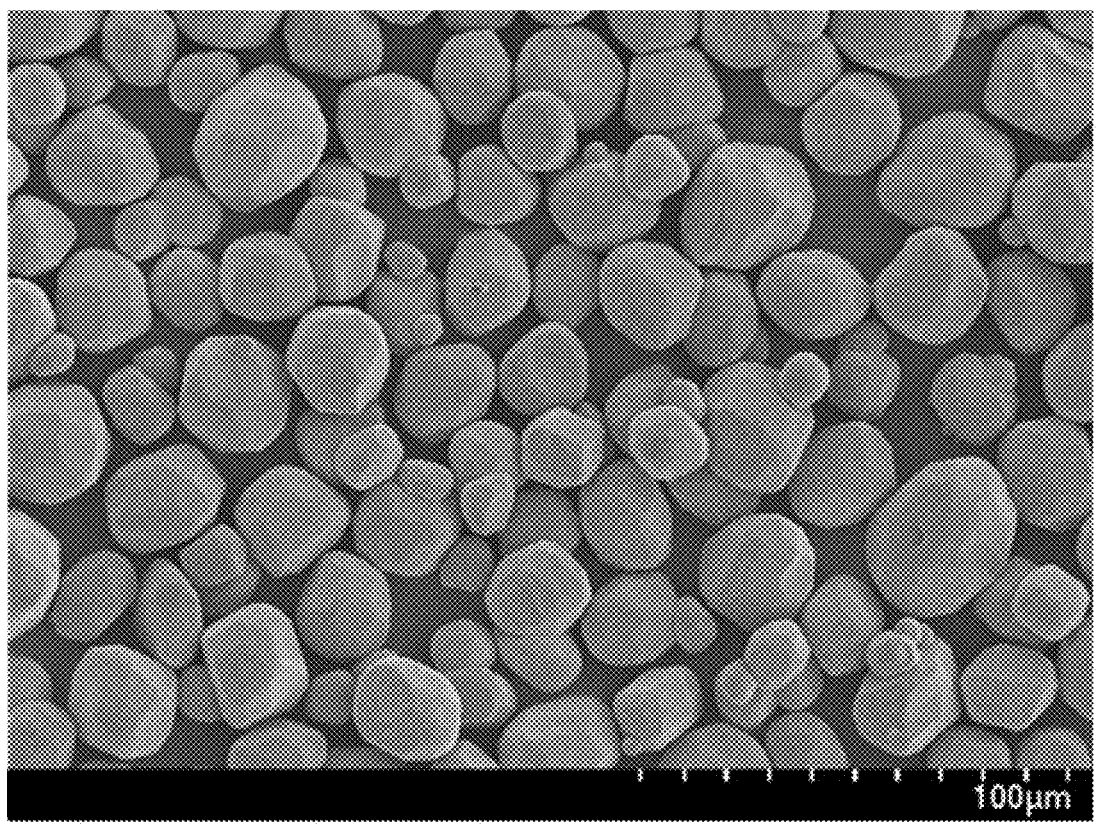
FIG. 1 is the SEM micrograph showing the rare earth aluminate fluorescent material of Example 1.

The method for producing a rare earth aluminate fluorescent material, the rare earth aluminate fluorescent material, and the light emitting device according to the present invention will be described with reference to embodiments below. However, the embodiments shown below are examples for substantiating the technical concept of the present invention, and the present invention is not limited to the method for producing a rare earth aluminate fluorescent material, the rare earth aluminate fluorescent material, and the light emitting device shown below. The relationships between the color names and the color coordinates, the relationships between the wavelength ranges of light and the color names of monochromatic light, and the like are in accordance with JIS Z8110.
Method for Producing Rare Earth Aluminate Fluorescent Material The method for producing a rare earth aluminate fluorescent material, includes: preparing, as raw materials, cerium oxide having a crystallite diameter in a range of 200 Å or more and 1,600 Å or less, a compound containing at least one kind of a rare earth element Ln selected from the group consisting of Y, La, Lu, Gd, and Tb, a compound containing Al, and depending on necessity a compound containing at least one kind of an element M1 selected from the group consisting of Ga and Sc, wherein a total molar ratio of the rare earth element Ln and cerium is 3, a total molar ratio of Al and the element M1 is a product of a parameter k in a range of 0.95 or more and 1.05 or less and 5, a molar ratio of cerium is a product of a parameter n in a range of 0.005 or more and 0.050 or less and 3, and a molar ratio of the element M1 is a product of a parameter m in a range of 0 or more and 0.02 or less, the parameter k, and 5; and subjecting a mixture of the raw materials to a heat treatment provide a calcined product.
Preparation of Raw Materials
Cerium Oxide Cerium oxide is used as a raw material of Ce, which becomes an activation element of the rare earth aluminate fluorescent material. In the case where the crystallite diameter of cerium oxide is in a range of 200 Å or more and 1,600 Å or less, the individual particles of cerium oxide can be readily brought into contact with the particles of the other raw materials, and cerium oxide may also function as a flux. In the case where the crystallite diameter of cerium oxide is in a range of 200 Å or more and 1,600 Å or less, the reactivity of the raw materials including cerium oxide may be enhanced to accelerate the crystal growth of the resulting rare earth aluminate fluorescent material, and the fluorescent material having a large particle diameter can be obtained. The crystallite diameter of cerium oxide used as the raw material is preferably in a range of 200 Å or more and 1,550 Å or less, more preferably in a range of 250 Å or more and 1,500 Å or less. The crystallite diameter means the size of an aggregate that can be regarded as a single crystal. With a larger value of the crystallite diameter, the crystallinity is better. In the case where the crystallite diameter of cerium oxide used as the raw material is too small, cerium oxide is difficult to function as a flux due to the low crystallinity thereof, and the crystal growth of the resulting fluorescent material cannot be accelerated. In the case where the crystallite diameter of cerium oxide used as the raw material is too large, the reactivity may be lowered to fail to provide the fluorescent material having a large particle diameter in some cases.

The crystallite diameter is a value that is measured in the following manner.

A specimen is measured for an XDR pattern with an X-ray diffractometer.

A diffraction peak shape is calculated with an analysis software using the fundamental parameter method capable of performing quantitative determination from the universal physical constants without the use of a standard specimen, and XRD (X-ray diffraction) patterns of crystal structure models are simulated by using the database of ICDD (International Center for Diffraction Data).

The XRD pattern obtained by measuring the specimen and the XRD patterns obtained from the crystal structure models are fitted, and the crystallite diameter of the specimen is measured from the value obtained by the Rietveld refinement method, in which the residual error is minimized by optimizing through the least square method. The data used for cerium oxide may be ICDD Card No. 00-004-0593, the data used for the single phase of $Y_3Al_5O_{12}$ may be ICDD Card No. 01-071-0255, and the data used for the single phase of $Lu_3Al_5O_{12}$ may be ICDD Card No. 01-080-4982.

Cerium oxide having a crystallite diameter in a range of 200 Å or more and 1,600 Å or less has preferably been subjected to a preheat treatment in a temperature range of 700° C. or more and 1,300° C. or less. The temperature of the preheat treatment of cerium oxide is more preferably in a range of 700° C. or more and 1,200° C. or less, and further preferably in a range of 800° C. or more and 1,000° C. or less. In the case where cerium oxide is subjected to a preheat treatment in a temperature range of 700° C. or more and 1,300° C. or less, the crystallinity of cerium oxide can be enhanced to make a crystallite diameter in a range of 200 Å or more and 1,600 Å or less. In the case where cerium oxide has been subjected to a preheat treatment in a temperature range of 700° C. or more and 1,300° C. or less, the impurities, such as hydroxides, attached to the surface of cerium oxide may be removed, and the purity thereof may also be enhanced, by which the reactivity of cerium oxide to the other compounds than cerium oxide may be enhanced to provide the rare earth aluminate fluorescent material having a large particle diameter.

The period of time of the preheat treatment of cerium oxide is preferably in such a pattern that the temperature is decreased within 5 minutes after reaching the temperature for the preheat treatment for suppressing the growth of the particle diameter of the cerium oxide particles. For improving the dispersibility of cerium oxide used as the raw material, the growth of the particle diameter of the cerium oxide particles is preferably suppressed. The preheat treatment of cerium oxide is preferably performed in such a pattern that the temperature is increased in a rage of 3° C./min or more and 7° C./min or less to reach the temperature for the preheat treatment, and then decreased by terminating the heating within 5 minutes from the achievement of the temperature for the preheat treatment.

The atmosphere for the preheat treatment of cerium oxide may be an inert atmosphere, such as argon or nitrogen, or an oxidizing atmosphere, such as the air. As for the pressure of the atmosphere, cerium oxide may be subjected to the preheat treatment under the atmospheric pressure without pressurizing.

Cerium oxide preferably has a median diameter Dmc measured by the laser diffraction scattering particle size measurement method in a range of 0.04 μm or more and 0.12 μm or more, and more preferably in a range of 0.05 μm or more and 0.10 μm or less. The median diameter Dmc of cerium oxide used as the raw material cannot be accurately measured due to the small value thereof of 0.2 μm or less, and therefore can be considered as a reference value.

Cerium oxide preferably has a BET specific surface area in a range of 4.2 m$^2$/g or more and 130.0 m$^2$/g or less, more preferably in a range of 4.5 m$^2$/g or more and 125.0 m$^2$/g or less, further preferably in a range of 10.0 m$^2$/g or more and 125.0 m$^2$/g or less, and particularly preferably in a range of 11.0 m$^2$/g or more and 125.0 m$^2$/g or less. In the case where the BET specific surface area of cerium oxide used as the raw material is in a range of 4.2 m$^2$/g or more and 130 m$^2$/g or less, cerium oxide can be readily brought into contact with the powder of the other raw materials to enhance the reactivity, and thus the fluorescent material having a large particle diameter can be obtained. The BET specific surface area of cerium oxide can be measured by the BET method, for example, with an automatic specific surface area measurement device.

Raw Materials Other than Cerium Oxide

The raw materials of the rare earth aluminate fluorescent material other than cerium oxide include a compound containing at least one kind of a rare earth element Ln selected from the group consisting of Y, La, Lu, Gd, and Tb, a compound containing Al, and depending on necessity a compound containing at least one kind of an element M1 selected from the group consisting of Ga and Sc. These compounds and cerium oxide having a crystallite diameter in a range of 200 Å or more and 1,600 Å or less are prepared as raw materials, and the raw materials are mixed, so as to regulate the molar ratios of Ce, the rare earth element Ln, Al, and depending on necessity the at least one kind of an element M1 selected from the group consisting of Ga and Sc contained in the raw materials within the particular ranges. The rare earth element Ln preferably contains at least one kind selected from the group consisting of Y, Lu, and Tb, more preferably contains at least one kind selected from the group consisting of Y and Lu, and further preferably contains Y. In the case where the rare earth element Ln contains Y, the rare earth aluminate fluorescent material having a light emission spectrum containing yellow color can be obtained.

Examples of the compound containing a rare earth element Ln, the compound containing Al, and the compound containing at least one kind of an element M1 selected from the group consisting of Ga and Sc include oxides and metal salts. In the compound containing a rare earth element Ln, the compound containing Al, and the compound containing at least one kind of an element M1 selected from the group consisting of Ga and Sc, at least one compound thereof is preferably an oxide.

Examples of the metal salts include an oxalate, a carbonate, a chloride, a nitrate, and a sulfate. The compound used as the raw material may be in the form of a hydrate.

Specific examples of the oxide include $Y_2O_3$, $La_2O_3$, $Lu_2O_3$, $Gd_2O_3$, $Tb_4O_7$, $CeO_2$, $Al_2O_3$, $Ga_2O_3$, and $Sc_2O_3$.

Specific examples of the metal salt include $YCl_3$, $Y_2(C_2O_4)_3$, $Y_2(CO_3)_3$, $Y(NO_3)_3$, $Y_2(SO_4)_3$, $LaC_3$, $La_2(C_2O_4)_3$, $La_2(CO_3)_3$, $La(NO_3)_3$, $La_2(SO_4)_3$, $LuCl_3$, $Lu_2(C_2O_4)_3$, $Lu(NO_3)_3$, $Lu_2(SO_4)_3$, $GdCl_3$, $TbCl_3$, $CeCl_3$, $Ce_2(SO_4)_3$, $AlC_{13}$, $Al(NO_3)_3$, $Al_2(SO_4)_3$, $GaCl_3$, $Ga(NO_3)_3$, $ScCl_3$, and $Sc(N_{O3})_3$.

Mixture

The mixture may be obtained by mixing the raw material by regulating the raw materials to provide a composition during preparation having a total molar ratio of the rare earth element Ln and Ce of 3, a total molar ratio of Al and the element M1 of a product of a parameter k in a range of 0.95 or more and 1.05 or less and 5, and a molar ratio of Ce of a product of a parameter n in a range of 0.005 or more and 0.050 or less and 3. The parameter n is preferably a value in a range of 0.008 or more and 0.045 or less, and more preferably a value in a range of 0.009 or more and 0.040 or less.

In the case where the compound containing the element M1 is used, the compound containing the element M1 is preferably mixed by regulating to provide a composition during preparation having a molar ratio of the element M1 of a product of a parameter m in a range of 0 or more and 0.02 or less, a parameter k in a range of 0.95 or more and 1.05 or less, and 5. The mixture may not contain the compound containing the element M1.

The mixture preferably contains the raw materials mixed to provide a composition during preparation represented by the following formula (I):

$$(Ln_{1-n}Ce_n)_3(Al_{1-m}M1_m)_{5k}O_{12} \qquad (I)$$

wherein in the formula (I), Ln represents at least one kind of a rare earth element selected from the group consisting of Y, La, Lu, Gd, and Tb; M1 represents at least one kind of an element selected from the group consisting of Ga and Sc; and k, m, and n each satisfy $0.95 \le k \le 1.05$, $0 \le m \le 0.02$, and $0.005 \le n \le 0.050$.

The mixture preferably contains the raw materials that are mixed to provide a composition during preparation represented by the formula (I), and thereby the rare earth aluminate fluorescent material having a target light emission peak wavelength and having a large particle diameter can be obtained.

The mixture may contain a compound containing at least one kind of an element selected from the group consisting of Ba, Sr, Ca, Mg, and Mn, as a flux. In the case where the mixture contains the flux in addition to the raw materials, the reaction among the raw materials may be accelerated to facilitate the solid state reaction proceeding uniformly. It is considered that the reaction is accelerated since the temperature for providing a calcined product through the heat treatment of the mixture is substantially the same as the formation temperature of the liquid phase of the halide used as the flux or is higher than the formation temperature. Cerium oxide having a crystallite diameter in a range of 200 Å or more and 1,600 Å or less used as the raw material also has an effect as a flux, and therefore the mixture may not contain the flux.

The compound containing at least one kind of an element selected from the group consisting of Ba, Sr, Ca, Mg, and Mn used as a flux is preferably in the form of a halide. The halide of the compound used as a flux is preferably a fluoride and/or a chloride, and more preferably a fluoride. The compound used as a flux is further preferably $BaF_2$. This is because the use of $BaF_2$ as a flux may stabilize the garnet crystal structure of the rare earth aluminate fluorescent material, so as to facilitate the formation of the composition of the garnet crystal structure. The content of the compound used as a flux is preferably in a range of 0.5% by mass or more and 10% by mass or less based on the total amount of the mixture including the flux as 100% by mass. In the case where the content of the flux in the mixture is in the range, the reaction among the raw materials may be accelerated to perform the solid state reaction further uniformly, thereby facilitating the formation of the rare earth aluminate fluorescent material having the target composition. The content of the flux is more preferably in a range of 1.0% by mass or more and 8.0% by mass or less, and further preferably in a range of 1.5% by mass or more and 7.0% by mass or less, based on the total amount of the mixture as 100% by mass.

The mixture may be formed in such a manner that the raw materials are weighed by controlling the raw materials to provide the target composition during preparation, and then the raw materials may be pulverized and mixed with a dry pulverizer, such as a ball mill, a vibration mill, a hammer mill, a roll mill, or a jet mill, may be pulverized and mixed with a mortar and a pestle, or may be mixed with a mixer, such as a ribbon blender, a Henschel mixer, or a V-blender, or may be pulverized and mixed by using both the dry pulverizer and the mixer. The mixing process may be either dry mixing or wet mixing by adding a solvent thereto. The mixing process is preferably performed by dry mixing. This is because the process time can be shortened in dry process rather than wet process, resulting in the enhancement of the productivity.

Heat Treatment

The method for producing a rare earth aluminate fluorescent material includes subjecting the mixture to a heat treatment to provide a calcined product. The mixture may be subjected to a heat treatment by placing on a crucible or a boat formed of such a material as a carbonaceous material, such as graphite, boron nitride (BN), aluminum oxide (alumina), tungsten (W), or molybdenum (Mo). The heat treatment may be performed, for example, by using an electric furnace or a gas furnace.

The heat treatment temperature is preferably in a range of 1,400° C. or more and 1,800° C. or less, and more preferably in a range of 1,450° C. or more and 1,700° C. or less, from the standpoint of the stabilization of the crystal structure of the resulting calcined product and the formation of the calcined product having a large particle diameter.

The heat treatment time may vary depending on the temperature increasing rate, the heat treatment atmosphere, and the retention time at the heat treatment temperature after reaching the heat treatment temperature is preferably 1 hour or more, more preferably 3 hours or more, and further preferably 5 hours or more, and is preferably 20 hours or less, more preferably 18 hours or less, and further preferably 15 hours or less. For the heat treatment time, the retention time at the heat treatment temperature after reaching the heat treatment temperature is preferably 5 hours or more and 20 hours or less, and more preferably 8 hours or more and 15 hours or less.

The heat treatment atmosphere is preferably a reducing atmosphere. The heat treatment may be performed in a reducing atmosphere containing at least one kind of nitrogen, hydrogen, a compound having reducibility, and ammonia. The mixture may have high reactivity in an atmosphere having high reducing power, and the calcined product can be obtained by calcining under the atmospheric pressure without pressurization. In the case where the mixture is calcined in an atmosphere having high reducing power, tetravalent Ce ($Ce^{4+}$) is reduced to trivalent Ce ($Ce^{3+}$), so as to provide a calcined product having an increased proportion of trivalent Ce, which contributes to the light emission in the calcined product. The resulting calcined product is a rare earth aluminate fluorescent material, and the calcined product can be used directly as a rare earth aluminate fluorescent material, or can be used as a rare earth aluminate fluorescent material after subjecting to a dispersion treatment and/or an acid cleaning treatment described later.

Dispersion Treatment

The resulting calcined product is preferably subjected to a dispersion treatment including wet dispersion, wet sieving, and sedimentation classification. Specifically, it is preferred that the resulting calcined product is wet dispersed, from which coarse particles are removed through wet sieving, and then fine particles are removed through sedimentation classification. The sedimentation classification may be performed twice or more, and the number of times of the sedimentation classification is preferably 20 or less from the standpoint of the enhancement of the productivity. The particle diameter of the resulting calcined product can be made uniform through the dispersion treatment. The aqueous medium used for the wet dispersion may be water. The wet dispersion may be performed by using a dispersion medium, such as alumina balls and zirconia balls. The period of time of the wet dispersion is preferably in a range of 4 hours or more and 50 hours or less, and more preferably in a range of 5 hours or more and 40 hours or less, in consideration of the productivity.

Acid Cleaning Treatment

The resulting calcined product is preferably subjected to an acid cleaning treatment. The calcined product is more preferably subjected to an acid cleaning treatment after the dispersion treatment. The impurities attached to the surface of the calcined product can be removed through the acid cleaning treatment. The acid cleaning treatment is preferably performed with a hydrochloric acid aqueous solution, which is readily available and inexpensive. The concentration of hydrochloric acid contained in the hydrochloric acid aqueous solution is preferably such a concentration that removes the impurities on the surface and does not affect the crystal structure of the calcined product, and is preferably in a range of 1% by mass or more and 20% by mass or less, and more preferably in a range of 5% by mass or more and 18% by mass or less.

The rare earth aluminate fluorescent material obtained through the aforementioned production method preferably has a composition represented by the following formula (I):

$$(Ln_{1-n}Ce_n)_3(Al_{1-m}M1_m)_{5k}O_{12} \qquad (I)$$

wherein in the formula (I), Ln represents at least one kind of a rare earth element selected from the group consisting of Y, La, Lu, Gd, and Tb; M1 represents at least one kind of an element selected from the group consisting of Ga and Sc; and k, m, and n each satisfy $0.95 \leq k \leq 1.05$, $0 \leq m \leq 0.02$, and $0.005 \leq n \leq 0.050$.

The rare earth aluminate fluorescent material has an average particle diameter Db measured by the Fisher sub-sieve sizer method (which may be hereinafter referred to as the FSSS method) in a range of 22 μm or more and 50 μm or less, and has an average circle equivalent diameter De in a range of 26 μm or more and 45 μm or less. In the resulting rare earth aluminate fluorescent material, the crystal growth is accelerated due to the use of cerium oxide having a crystallite diameter in a range of 200 Å or more and 1,600 Å or less as the raw material, and thus the rare earth aluminate fluorescent material having a larger average particle diameter can be obtained than a rare earth aluminate fluorescent material that does not use cerium oxide having a crystallite diameter in a range of 200 Å or more and 1,600 Å or less as the raw material. The average particle diameter Db by the FSSS method of the rare earth aluminate fluorescent material may be the average particle diameter before the dispersion treatment or before the acid cleaning treatment, and may be the average particle diameter after the dispersion treatment or after the acid cleaning treatment. A fluorescent material tends to have a higher light emission intensity with a larger particle diameter thereof, but a too large particle diameter may deteriorate the handleability in the production process, and therefore the average particle diameter by the FSSS method of the resulting rare earth aluminate fluorescent material is 50 μm or less.

Rare Earth Aluminate Fluorescent Material

The rare earth aluminate fluorescent material has a composition containing at least one kind of a rare earth element Ln selected from the group consisting of Y, La, Lu, Gd, and Tb; Ce; Al; O; and depending on necessity at least one kind of an element M1 selected from the group consisting of Ga and Sc, wherein a total molar ratio of the rare earth element Ln and Ce is 3, a molar ratio of Ce is a product of a parameter n in a range of 0.005 or more and 0.050 or less and 3, a total molar ratio of Al and the element M1 is a product of a parameter k in a range of 0.95 or more and 1.05 or less and 5, a molar ratio of the element M1 is a product of a parameter m in a range of 0 or more and 0.02 or less, the parameter k, and 5, and a molar ratio of O is 12, in 1 mol of the composition, and wherein the rare earth aluminate fluorescent material has an average particle diameter Db measured by the FSSS method in a range of 22 μm or more and 50 μm or less, and has an average circle equivalent diameter De in a range of 26 μm or more and 45 μm or less. The rare earth aluminate fluorescent material is preferably a rare earth aluminate fluorescent material that is obtained through the production method according to the first embodiment of the present disclosure.

The rare earth aluminate fluorescent material preferably has a composition represented by the aforementioned formula (I). Ce in the rare earth aluminate fluorescent material is an activation element, and the molar ratio of Ce in 1 mol of the composition of the rare earth aluminate fluorescent material is represented by the product of the parameter n and 3. For achieving the target light emission peak wavelength and the target light emission intensity of the rare earth aluminate fluorescent material, the parameter n is a value in a range of 0.005 or more and 0.050 or less ($0.005 \leq n \leq 0.050$), more preferably in a range of 0.008 or more and 0.045 or less ($0.008 \leq n \leq 0.045$), and further preferably in a range of 0.009 or more and 0.040 or less ($0.009 \leq n \leq 0.040$).

In the composition of the rare earth aluminate fluorescent material, the rare earth element Ln is an element that constitutes the crystal structure of a garnet structure along with Al and depending on necessity the element M1 selected from the group consisting of Ga and Sc. The rare earth element Ln preferably contains at least one kind selected from the group consisting of Y, Lu, and Tb, and more preferably contains at least one kind selected from the group consisting of Y and Lu. In the case where the rare earth element Ln in the composition of the rare earth aluminate fluorescent material contains Y, a light emission spectrum containing yellow color can be obtained.

In the composition of the rare earth aluminate fluorescent material, the element M1 selected from the group consisting of Ga and Sc, which may be contained depending on necessity, constitutes the crystal structure of a garnet structure along with Al. The element M1 preferably contains Ga. In the composition of the rare earth aluminate fluorescent material, the element M1 is represented by the product of the parameter m in a range of 0 or more and 0.02 or less, the parameter k in a range of 0.95 or more and 1.05 or less, and 5. The parameter m is in a range of 0 or more and 0.02 or less ($0 \leq m \leq 0.02$), and may be a value in a range of more than 0 and 0.02 or less ($0 < m \leq 0.02$), from the standpoint of the stability of the crystal structure of the rare earth aluminate fluorescent material.

In the composition of the rare earth aluminate fluorescent material, 5 is the coefficient of the parameter k of the total molar ratio $5k$ of Al and the element M1. In the composition of the rare earth aluminate fluorescent material, the total molar ratio of Al and the element M1 may be less than 5 in some cases and may exceed 5 in other cases. The parameter k is a value in a range of 0.95 or more and 1.05 or less ($0.95 \leq k \leq 1.05$), more preferably in a range of 0.98 or more and 1.02 or less ($0.98 \leq k \leq 1.02$), and further preferably in a range of 0.99 or more and 1.01 or less ($0.99 \leq k \leq 1.01$), from the standpoint of the stability of the crystal structure.

The rare earth aluminate fluorescent material preferably has an average particle diameter Db measured by the FSSS method of 23 μm or more, and more preferably 24 μm or more. The average particle diameter Db measured by the FSSS method of the rare earth aluminate fluorescent material is preferably larger from the standpoint of the light emission intensity, but a too large average particle diameter may deteriorate the handleability in the production process, and therefore the average particle diameter of the rare earth aluminate fluorescent material is 50 μm or less, and preferably 45 μm or less. The average particle diameter Db measured by the FSSS method may be referred to as a Fisher sub-sieve sizer's number. The FSSS method is a method for obtaining a particle diameter from the specific surface area by measuring the specific surface area by utilizing the flow resistance of air by the air permeability method.

The rare earth aluminate fluorescent material preferably has an average circle equivalent diameter De in a range of 26 μm or more and 45 μm or less, more preferably in a range of 27 μm or more and 42 μm or less, even more preferably in a range of 32 μm or more and 40 μm or less. The average circle equivalent diameter of the rare earth aluminate fluorescent material may also vary depending on the aggregated state and the shape of the fluorescent material. In the case where the fluorescent material is in the form of primary particles and has a shape near a spherical shape, the rare earth aluminate fluorescent material that has an average circle equivalent diameter De in the aforementioned range can have a large particle diameter, a high light emission intensity used in a light emitting device, good dispersibility, and good handleability in the production process.

The average circle equivalent diameter De of the rare earth aluminate fluorescent material is a value that is measured in the following manner. An SEM micrograph of the rare earth aluminate fluorescent material obtained with a scanning electron microscope (which may be hereinafter referred to as SEM) is subjected to image analysis with an image analysis software (such as ImageJ), and 20 or more of the fluorescent material particles, the contour of each of which can be confirmed in the SEM micrograph, except for the fluorescent particles of 1 pixel of less, are binarized. For each of the 20 or more of the binarized specimens, the binarized particle shape is assumed to be a circle, and diameter of a true circle having the same area as that circle is designated as the circle equivalent diameter. In the measured specimens, 20 specimens are selected from the larger circle equivalent diameter side, and the arithmetic average value of the circle equivalent diameters of the 20 specimens is designated as the average circle equivalent diameter De. ImageJ is a public domain image analysis software developed by the National Institute of Health.

The rare earth aluminate fluorescent material preferably has an average particle area Ap in a range of 500 $\mu m^2$ or more and 3,000 $\mu m^2$ or less, more preferably in a range of 550 $\mu m^2$ or more and 2,500 $\mu m^2$ or less, and further preferably in a range of 600 $\mu m^2$ or more and 2,000 $\mu m^2$ or less. The average particle area Ap of the rare earth aluminate fluorescent material may also vary depending on the aggregated state and the shape of the fluorescent material. In the case where the fluorescent material is in the form of primary particles and has a shape near a spherical shape, the rare earth aluminate fluorescent material that has an average particle area Ap in a range of 500 $\mu m^2$ or more and 3,000 $\mu m^2$ or less can have a large particle diameter and good handleability in the production process. The rare earth aluminate fluorescent material preferably has an average circle equivalent diameter De in a range of 26 $\mu m$ or more and 45 $\mu m$ or less and an average particle area Ap in a range of 550 $\mu m^2$ or more and 2,500 $\mu m^2$ or less from the standpoint of the light emission intensity used in a light emitting device and the handleability.

The average particle area Ap of the rare earth aluminate fluorescent material is a value that is measured in the following manner. An SEM micrograph of the rare earth aluminate fluorescent material is subjected to image analysis with an image analysis software (such as ImageJ). By the image analysis of the SEM micrograph of the rare earth aluminate fluorescent material, 20 or more of the fluorescent material particles, the contour of each of which can be confirmed in the SEM micrograph, except for the fluorescent particles of 1 pixel of less, are binarized. For each of the 20 or more of the binarized specimens, the product of the number of pixels constituting the binarized particle shape and the magnification ratio is designated as the particle area of the fluorescent material particle. In the measured specimens, 20 specimens are selected from the larger particle area side, and the arithmetic average value of the particle areas of the 20 specimens is designated as the average particle area Ap.

The rare earth aluminate fluorescent material preferably has a median diameter Dm measured by the laser diffraction scattering particle size measurement method of 23 $\mu m$ or more, more preferably 24 $\mu m$ or more, and further preferably 25 $\mu m$ or more. The rare earth aluminate fluorescent material preferably has a median diameter Dm of 55 $\mu m$ or less, and more preferably 50 $\mu m$ or less, since good handleability may be obtained in the production process. The median diameter measured by the laser diffraction scattering particle size measurement method is a particle diameter at a cumulative frequency reaching 50% from the small diameter side (median diameter).

The rare earth aluminate fluorescent material preferably has a diameter ratio Dm/Db of the median diameter Dm with respect to the average particle diameter Db measured by the FSSS method in a range of 0.80 or more and 1.30 or less, more preferably in a range of 0.90 or more and 1.20 or less, further preferably in a range of 0.95 or more and 1.15 or less, and still further preferably in a range of 1.00 or more and 1.10 or less. The case where the rare earth aluminate fluorescent material has a diameter ratio Dm/Db of the median diameter Dm with respect to the average particle diameter Db measured by the FSSS method of near 1 means that the powder of the rare earth aluminate fluorescent material has a small content of secondary particles therein and is substantially constituted by primary particles. In the case where the rare earth aluminate fluorescent material is substantially constituted by primary particles, the use thereof in a light emitting device may provide good dispersibility, good handleability, and an increased light emission intensity of the light emitting device.

Light Emitting Device

The rare earth aluminate fluorescent material that is combined with a light emitting element can convert the light emitted from the light emitting element, and can constitute a light emitting device that emits mixed light of the light emitted from the light emitting element and the light having been subjected to wavelength conversion by the rare earth aluminate fluorescent material. The light emission peak wavelength of the light emitting element may be in a range of 350 nm or more and 500 nm or less, may also be in a range of 380 nm or more and 485 nm or more, and is preferably in a range of 390 nm or more and 480 nm or less. Examples of the light emitting element used include a semiconductor light emitting element using a nitride semiconductor ($In_XAl_YGa_{1-X-Y}N$, wherein $0 \leq X$, $0 \leq Y$, and $X+Y \leq 1$). The use of the semiconductor light emitting element as the excitation light source can provide a light emitting device that has high efficiency, high linearity of output with respect to input, and high stability against mechanical impacts.

The rare earth aluminate fluorescent material that is combined with a laser light source can constitute a light emitting device used as a light source for a projector that converts the excitation light emitted from the laser light source and focused with a dichroic mirror or a collimated optical system. The light emitting element of the light emitting device is preferably a semiconductor laser.

The rare earth aluminate fluorescent material can be applied to a light emitting device used as a light source for a projector including a fluorescent material unit having the rare earth aluminate fluorescent material and a semiconductor laser. The light emitting device used as the light source of the projector may have, for example, a fluorescent material unit having a fluorescent material layer containing the rare earth aluminate fluorescent material. The fluorescent material unit may further has a reflection film, a substrate, and an adhesive layer, in addition to the fluorescent material layer containing the rare earth aluminate fluorescent material. The fluorescent material unit may have the fluorescent material layer on a wheel substrate that is rotatably supported by a motor.

In the projector having the light emitting device used as a light source for a projector, white mixed light emitted from the light emitting device is separated into a red light component, a green light component, and a blue light component with a color separation optical system having a dichroic mirror, a reflection mirror, a relay lens, and the like, the light components of colors thus separated are made incident on image forming regions of the colors of a liquid crystal panel respectively, and the components of the incident light are modulated according to the image information to form color image light.

EXAMPLES

The present disclosure will be described more specifically with reference to examples below. The present disclosure is not limited to the examples.

Preparation of Cerium Oxide

Cerium oxide ($CeO_2$) used as a raw material was subjected to a heat treatment. The heat treatment was performed in such a manner that cerium oxide ($CeO_2$) was placed in an alumina crucible and heated to 800° C. or 1,200° C. at a temperature increasing rate of from 3° C./min to 7°/min in the air, the heating was terminated after reaching the heat treatment temperature, and cerium oxide was cooled to room temperature to provide heat-treated cerium oxide. The crystallite diameter, the median diameter Dmc, and the BET specific surface area of cerium oxide before and after the heat treatment were measured in the methods described later. The results are shown in Table 1 below. Cerium oxide thus measured has a median diameter Dmc of 0.1 m or less, which is a reference value since the median diameter Dmc is small.

TABLE 1

|  | Heat treatment temperature (° C.) | Crystallite diameter (Å) | Median diameter Dmc (μm) | BET specific surface area ($m^2$/g) |
| --- | --- | --- | --- | --- |
| Cerium oxide before heat treatment | — | 90.8 | 0.088 | 125.0 |
| Cerium oxide 1 after heat treatment | 800 | 285.0 | 0.074 | 31.6 |
| Cerium oxide 2 after heat treatment | 1200 | 1460.0 | 0.065 | 4.9 |

As shown in Table 1, cerium oxide having a crystallite diameter in a range of 200 Å or more and 1,600 Å or less was obtained by subjecting to a preheat treatment in a temperature range of 700° C. or more and 1,300° C. or less. It was estimated that hydroxides attached to the surface of the preheat-treated cerium oxide were removed.

Example 1

Preparation of Raw Materials

Cerium oxide ($CeO_2$) having a crystallite diameter of 285.0 Å obtained through the heat treatment, yttrium oxide ($Y_2O_3$), aluminum oxide ($Al_2O_3$), and gallium oxide ($Ga_2O_3$) were used as raw materials, and weighed to make the composition during preparation shown in Table 2. Specifically, the raw materials were weighed by controlling to make Y:Ce:Al:Ga=2.942:0.058:5:0.05. The raw materials were mixed with a ball mill to provide a mixture.

Barium fluoride ($BaF_2$) as a flux was added to the mixture in an amount of 2.5% by mass based on the mixture as 100% by mass.

Calcining Step

The resulting mixture was placed in an alumina crucible and calcined in a reducing atmosphere at 1,500° C. for 10 hours to provide a calcined product.

Dispersion Treatment Step

The resulting calcined product, alumina balls as a dispersion medium, and pure water were placed in a vessel, and dispersed under rotation for 15 hours. Thereafter, coarse particles were removed by wet sieving. Subsequently, fine particles were removed by performing sedimentation classification.

Acid Cleaning Treatment Step

The second calcined product obtained through the sedimentation classification was subjected to acid cleaning with a hydrochloric acid aqueous solution having a hydrochloric acid concentration of 17% by mass, then rinsed with water, and isolated and dried, so as to provide a calcined product after acid cleaning as a rare earth aluminate fluorescent material of Example 1.

Example 2

Cerium oxide ($CeO_2$) having a crystallite diameter of 285.0 Å obtained through the heat treatment, lutetium oxide ($Lu_2O_3$), aluminum oxide ($Al_2O_3$), and gallium oxide ($Ga_2O_3$) were used as raw materials, and weighed to make the composition during preparation shown in Table 2. Specifically, the raw materials were weighed by controlling to make Lu:Ce:Al:Ga=2.917:0.083:5:0.025. The raw materials were mixed with a ball mill to provide a mixture. A rare earth aluminate fluorescent material was obtained in the same manner as in Example 1 except that barium fluoride ($BaF_2$) as a flux was added to the mixture in an amount of 4.0% by mass based on the mixture as 100% by mass.

Example 3

Cerium oxide ($CeO_2$) having a crystallite diameter of 285.0 Å obtained through the heat treatment, yttrium oxide ($Y_2O_3$), aluminum oxide ($Al_2O_3$), and gallium oxide ($Ga_2O_3$) were used as raw materials, and weighed to make the composition during preparation shown in Table 2. Specifically, the raw materials were weighed by controlling to make Y:Ce:Al:Ga=2.9715:0.0285:5:0.05. The raw materials were mixed with a ball mill to provide a mixture. A rare earth aluminate fluorescent material was obtained in the same manner as in Example 1 except that barium fluoride ($BaF_2$) as a flux was added to the mixture in an amount of 2.5% by mass based on the mixture as 100% by mass.

Comparative Example 1

A rare earth aluminate fluorescent material was obtained in the same manner as in Example 1 except that cerium oxide ($CeO_2$) having a crystallite diameter of 90.8 Å that had not been subjected to a heat treatment was used.

Comparative Example 2

A rare earth aluminate fluorescent material was obtained in the same manner as in Example 2 except that cerium oxide ($CeO_2$) having a crystallite diameter of 90.8 Å that had not been subjected to a heat treatment was used.

Comparative Example 3

A rare earth aluminate fluorescent material was obtained in the same manner as in Example 3 except that cerium oxide ($CeO_2$) having a crystallite diameter of 90.8 Å that had not been subjected to a heat treatment was used.

TABLE 2

| | Mixture | | | |
| --- | --- | --- | --- | --- |
| | Composition during preparation | Ce Parameter n | M1 Parameter m | Parameter k |
| Example 1 | $Y_{2.942}Ce_{0.058}Al_5Ga_{0.05}O_{12}$ | 0.0190 | 0.010 | 1.010 |
| Example 2 | $Lu_{2.917}Ce_{0.083}Al_5Ga_{0.025}O_{12}$ | 0.0280 | 0.005 | 1.005 |
| Example 3 | $Y_{2.9715}Ce_{0.0285}Al_5Ga_{0.05}O_{12}$ | 0.0095 | 0.010 | 1.010 |
| Comparative Example 1 | $Y_{2.942}Ce_{0.058}Al_5Ga_{0.05}O_{12}$ | 0.0190 | 0.010 | 1.010 |
| Comparative Example 2 | $Lu_{2.917}Ce_{0.083}Al_5Ga_{0.025}O_{12}$ | 0.0280 | 0.005 | 1.005 |
| Comparative Example 3 | $Y_{2.9715}Ce_{0.0285}Al_5Ga_{0.05}O_{12}$ | 0.0095 | 0.010 | 1.010 |

Crystallite Diameter

Cerium oxide before calcining and after calcining and the rare earth aluminate fluorescent materials of Examples and Comparative Examples each were subjected to an XRD measurement (X-ray: CuKα, tube voltage: 40 kV, tube current: 20 mA, scanning range: 10° or more and 70° or less (10°≤2θ≤70°), X-ray source: CuKα, scanning axis: 2θ/θ, measurement method: FT, coefficient unit: counts, step width: 0.02°, coefficient time: 20°/min) with an X-ray diffractometer (Ultima IV, manufactured by Rigaku Corporation). The measured data was read in an analysis software using the fundamental parameter method, PDXL (manufactured by Rigaku Corporation), XRD patterns of crystal structure models were simulated by using the database of ICDD, the XRD pattern obtained by the measurement and the XRD patterns obtained from the crystal structure models were fitted, and the crystallite diameter of the specimen was obtained from the value obtained by the Rietveld refinement method, in which the residual error was minimized by optimizing through the least square method. The data used for cerium oxide was ICDD Card No. 00-004-0593, the data used for the single phase of $Y_3Al_5O_{12}$ was ICDD Card No. 01-071-0255, and the data used for the single phase of $Lu_3Al_5O_{12}$ was ICDD Card No. 01-080-4982. The results are shown in Table 1 above and Table 3 below.

BET Specific Surface Area

Cerium oxide before calcining and after calcining was measured for the BET specific surface area by the BET method by using an automatic specific surface area measurement device (Macsorb, manufactured by Mountech Co., Ltd.). The results are shown in Table 1 above and Table 3 below.

Average Particle Diameter (Db) by FSSS Method

For each of the rare earth aluminate fluorescent materials of Examples and Comparative Examples, by using Fisher Sub-Sieve Sizer Model 95 (manufactured by Fisher Scientific, Inc.) under an environment of a temperature of 25° C. and a relative humidity of 70%, 1 cm³ of a specimen was weighed and packed in a dedicated tubular vessel, to which dry air was then fed at a constant pressure, and the specific surface area was read from the differential pressure, from which the average particle diameter by the FSSS method was calculated. The results are shown in Table 3 below.

Median Diameter (Dmc and Dm) by Laser Diffraction Scattering Particle Size Measurement Method Cerium oxide before calcining and after calcining and the rare earth aluminate fluorescent materials of Examples and Comparative Examples each were measured for the average particle diameter at a cumulative frequency reaching 50% from the small diameter side (median diameter) by using a laser diffraction particle size distribution measurement device (Master Sizer 3000, manufactured by Malvern Panalytical, Ltd.). The results are shown in Table 1 above and Table 3 below.

Particle Diameter Ratio Dm/Db

For each of the rare earth aluminate fluorescent materials of Examples and Comparative Examples, the diameter ratio Dm/Db of the median diameter Dm with respect to the average particle diameter Db by the FSSS method was calculated. The results are shown in Table 3 below.

Compositional Analysis

The resulting fluorescent materials each were measured for the mass percentages (% by mass) of the elements (Y, Lu, Ce, Al, Ga, and O) constituting the rare earth aluminate fluorescent material by using an inductively coupled plasma atomic emission spectroscope (ICP-AES) (Optima 8300, manufactured by Perkin Elmer, Inc.), and the molar ratios of the elements were calculated from the values of the mass percentages of the elements. The molar ratios of Y, Lu, Ce, Al, Ga, and O shown in Table 3 are values that are calculated based on 3, which is the total molar ratio of Y and Ce, or based on 3, which is the total molar ratio of Lu and Ce. The value obtained by dividing the molar ratio of Ce by the total molar ratio of Y or Lu and Ce of 3 was designated as the parameter n. The value obtained by dividing the molar ratio of Ga by the product of the total molar ratio of Al and Ga, 5, and the parameter k was designated as the parameter m. The parameter k is the coefficient of 5, and the product of the parameter k and 5 is the total molar ratio of Al and the element M1. The parameter n, the parameter m, and the parameter k are shown in Table 3.

Light Emission Intensity

For each of the rare earth aluminate fluorescent materials of Examples and Comparative Examples, the fluorescent material was irradiated with light having an excitation wavelength of 450 nm with a quantum efficiency measurement device (QE-2000, manufactured by Otsuka Electronics Co., Ltd.), the light emission spectrum at room temperature (25° C.±5° C.) was measured, the wavelength, at which the light emission spectrum was maximized, was designated as the peak wavelength (nm), and the light emission intensity at the light emission peak wavelength was measured. The relative light emission intensity was calculated for each of the combinations having the same composition, i.e., Example 1 and Comparative Example 1, Example 2 and Comparative Example 2, and Example 3 and Comparative Example 3. Specifically, the relative light emission intensity of Example 1 was obtained based on the light emission intensity of Comparative Example 1 as 100%. The relative light emission intensity of Example 2 was obtained based on the light emission intensity of Comparative Example 2 as 100%. The relative light emission intensity of Example 3 was obtained based on the light emission intensity of Comparative Example 3 as 100%. The results are shown in Table 3 below.

Average Circle Equivalent Diameter De

For each of the rare earth aluminate fluorescent materials of Examples and Comparative Examples, an SEM micrograph obtained with a scanning electron microscope (SEM) was subjected to image analysis with an image analysis software (ImageJ, manufactured by the National Institute of Health). 20 or more of the fluorescent material particles, the contour of each of which was confirmed in the SEM micrograph, except for the fluorescent particles of 1 pixel of less, were binarized, and for each of the 20 or more of the binarized specimens, the binarized particle shape was assumed to be a circle, and the diameter of a true circle having the same area as that circle was designated as the circle equivalent diameter. In the measured specimens, 20 specimens were selected from the larger circle equivalent diameter side, and the arithmetic average value of the circle equivalent diameters of the 20 specimens was designated as the average circle equivalent diameter De. The results are shown in Table 3 below.

Average Particle Area Ap

For each of the rare earth aluminate fluorescent materials of Examples and Comparative Examples, an SEM micrograph obtained with a scanning electron microscope (SEM) was subjected to image analysis with an image analysis software (ImageJ, manufactured by the National Institute of Health). 20 or more of the fluorescent material particles, the contour of each of which was confirmed in the SEM micrograph, except for the fluorescent particles of 1 pixel of less, were binarized, and for each of the 20 or more of the binarized specimens, the product of the number of pixels constituting the binarized particle shape and the magnification ratio was designated as the particle area of the fluorescent material particle. In the measured specimens, 20 specimens were selected from the larger particle area side, and the arithmetic average value of the particle areas of the 20 specimens was designated as the average particle area Ap. The results are shown in Table 3 below.

earth aluminate fluorescent materials of Comparative Examples 1 to 3 having the same compositions as the rare earth aluminate fluorescent materials of Examples 1 to 3 respectively, and thus retained the light emission intensity.

SEM Micrograph

Figure 2:
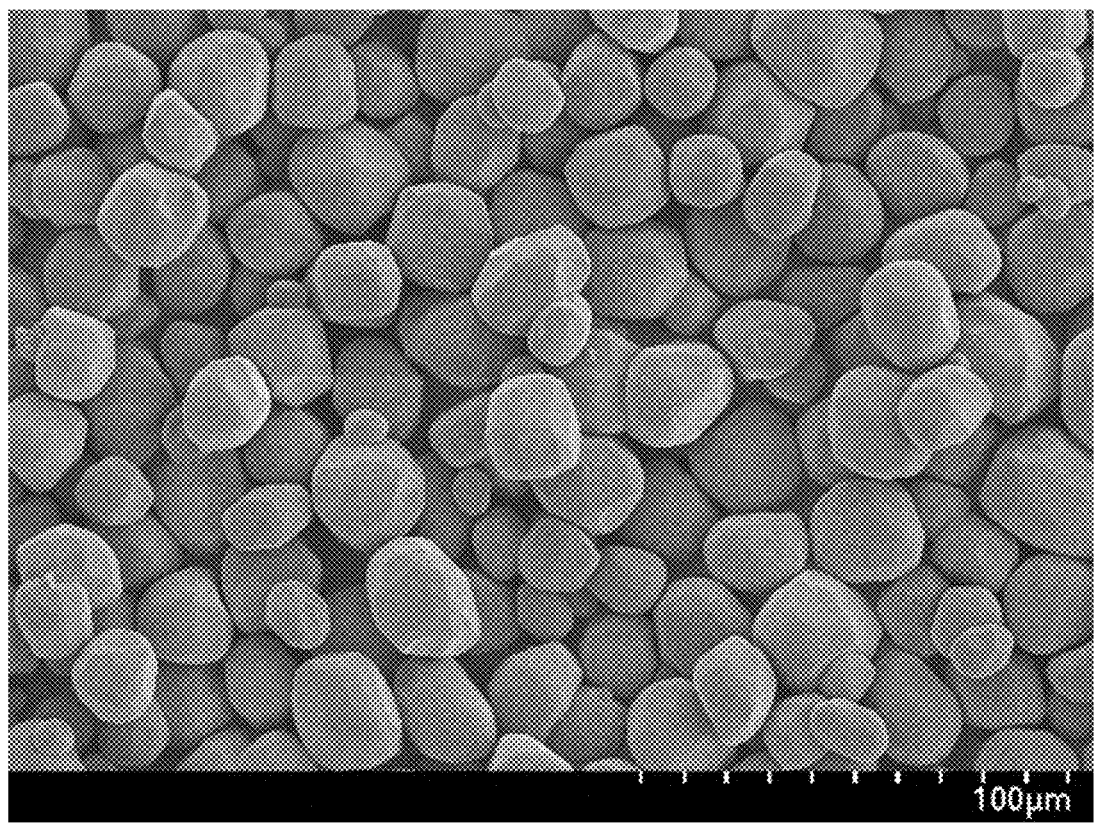
FIG. 2 is the SEM micrograph showing the rare earth aluminate fluorescent material of Comparative Example 1.
Figure 3:
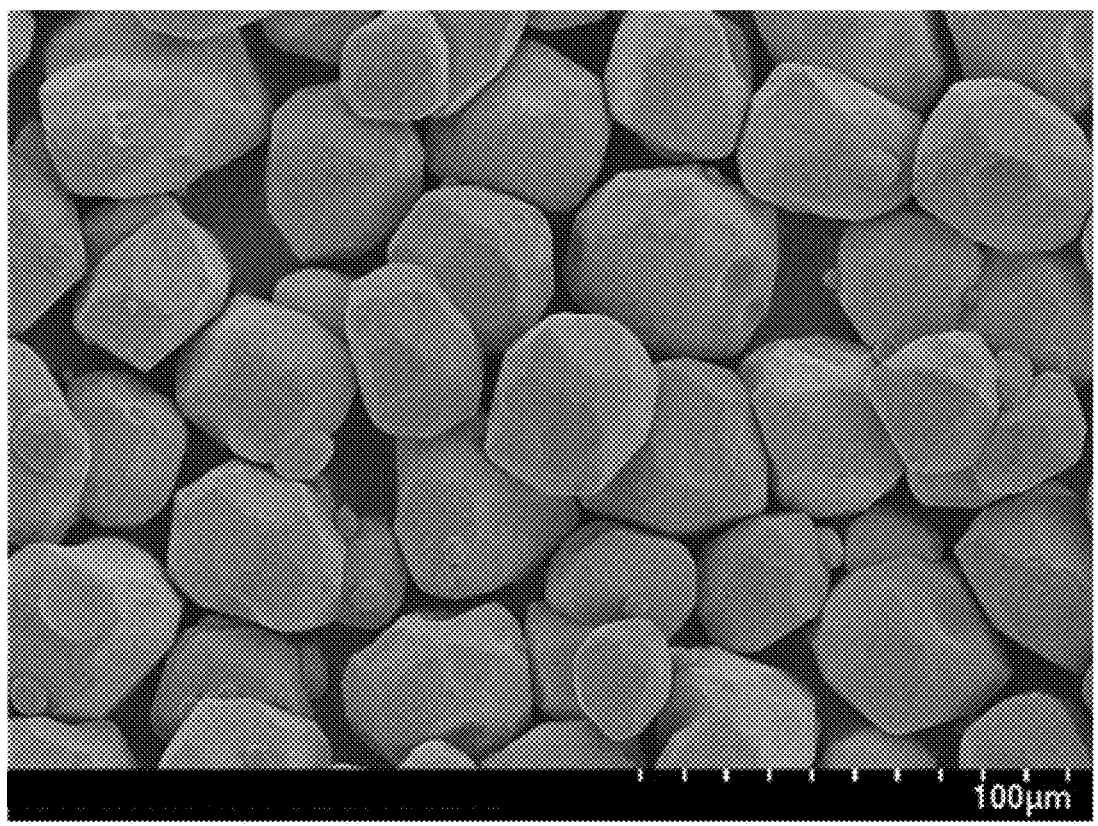
FIG. 3 is the SEM micrograph showing the rare earth aluminate fluorescent material of Example 2.
Figure 4:
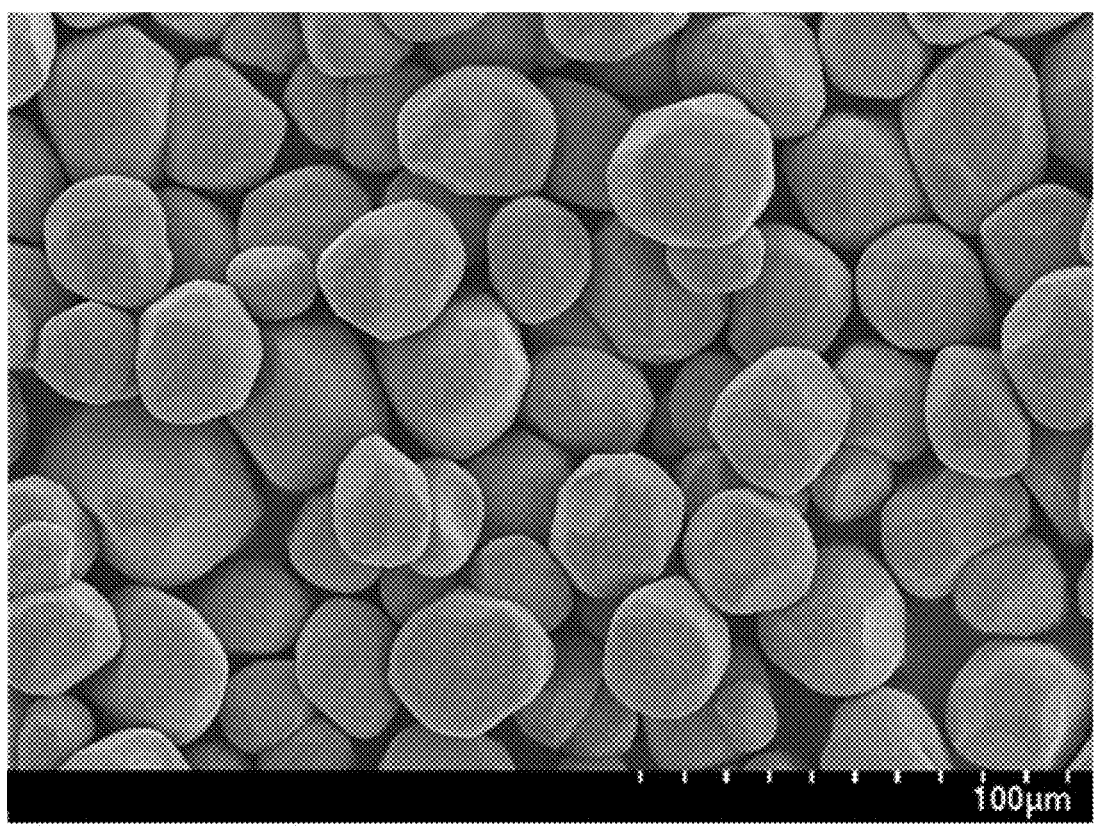
FIG. 4 is the SEM micrograph showing the rare earth aluminate fluorescent material of Comparative Example 2.

SEM micrographs were obtained for the rare earth aluminate fluorescent materials of Examples and Comparative Examples with a scanning electron microscope. FIG. 1 is the SEM micrograph of the rare earth aluminate fluorescent material of Example 1, and FIG. 2 is the SEM micrograph of the rare earth aluminate fluorescent material of Comparative Example 1. FIG. 3 is the SEM micrograph of the rare earth aluminate fluorescent material of Example 2, and FIG. 4 is the SEM micrograph of the rare earth aluminate fluorescent material of Comparative Example 2.

In the rare earth aluminate fluorescent material of Example 1 shown in FIG. 1, the neighbouring particles were not aggregated to each other, and the individual particles of the rare earth aluminate fluorescent material of Example 1 had larger particle diameters than the particles of the rare earth aluminate fluorescent material of Comparative Example 1 shown in FIG. 2 having the same composition. It was estimated from the result that in the rare earth aluminate fluorescent material of Example 1 using cerium oxide having a crystallite diameter in a range of 200 Å or more and 1,600 Å or less, the crystal growth of the individual particles was accelerated to provide larger particle diameters than the rare earth aluminate fluorescent material of Comparative Example 1.

In the rare earth aluminate fluorescent material of Example 2 shown in FIG. 3, the neighbouring particles were not aggregated to each other, and the individual particles of the rare earth aluminate fluorescent material of Example 2 had larger particle diameters than the particles of the rare earth aluminate fluorescent material of Comparative

TABLE 3

| | Fluorescent material | | | | Relative light emission intensity (%) | Average particle diameter Db (μm) | Average circle equivalent diameter De (μm) | Average particle area Ap (μm$^2$) | Median diameter Dm (μm) | Diameter ratio Dm/Db | Crystallite diameter (Å) |
|---|---|---|---|---|---|---|---|---|---|---|---|
| | Composition (analysis value) | Ce Parameter n | M1 Parameter m | Parameter k | | | | | | | |
| Example 1 | $Y_{2.949}Ce_{0.051}Al_{4.980}Ga_{0.028}O_{12}$ | 0.017 | 0.006 | 1.002 | 99.2 | 25.5 | 32.0 | 806.6 | 26.7 | 1.05 | 3854 |
| Example 2 | $LU_{2.955}Ce_{0.045}Al_{4.837}Ga_{0.034}O_{12}$ | 0.015 | 0.007 | 0.974 | 100.1 | 40.0 | 38.1 | 1140.3 | 44.0 | 1.10 | 3993 |
| Example 3 | $Y_{2.974}Ce_{0.026}Al_{4.956}Ga_{0.034}O_{12}$ | 0.009 | 0.007 | 0.998 | 101.4 | 24.0 | 27.7 | 603.1 | 25.7 | 1.07 | 3320 |
| Comparative Example 1 | $Y_{2.949}Ce_{0.051}Al_{4.958}Ga_{0.029}O_{12}$ | 0.017 | 0.006 | 0.997 | 100.0 | 24.5 | 24.2 | 458.8 | 25.7 | 1.05 | 3595 |
| Comparative Example 2 | $LU_{2.956}Ce_{0.044}Al_{4.974}Ga_{0.036}O_{12}$ | 0.015 | 0.007 | 1.002 | 100.0 | 33.0 | 25.5 | 508.7 | 36.3 | 1.10 | 3934 |
| Comparative Example 3 | $Y_{2.974}Ce_{0.026}Al_{4.944}Ga_{0.032}O_{12}$ | 0.009 | 0.006 | 0.995 | 100.0 | 20.5 | 25.3 | 501.0 | 22.3 | 1.09 | 3091 |

As shown in Table 3, the rare earth aluminate fluorescent materials of Examples 1 to 3 using cerium oxide having a crystallite diameter in a range of 200 Å or more and 1,600 Å or less were larger in all the average particle diameter Db, the average circle equivalent diameter De, the average particle area Ap, and the median diameter Dm than the rare earth aluminate fluorescent materials of Comparative Examples 1 to 3 having the same compositions as the rare earth aluminate fluorescent materials of Examples 1 to 3 respectively, and using cerium oxide having a crystallite diameter of less than 200 Å. The rare earth aluminate fluorescent materials of Examples 1 to 3 exhibited no large change in the light emission intensity as compared to the rare Example 2 shown in FIG. 4 having the same composition. It was estimated from the result that in the rare earth aluminate fluorescent material of Example 2 using cerium oxide having a crystallite diameter in a range of 200 Å or more and 1,600 Å or less, the crystal growth of the individual particles was further accelerated to provide larger particle diameters than the rare earth aluminate fluorescent material of Comparative Example 2.

The rare earth aluminate fluorescent material according to one embodiment of the present disclosure can be applied to a light emitting device as a light emitting device for automobile use or indoor illumination, a backlight of a liquid crystal display device, and a light source for projectors, by combining with a light emitting element, such as LED and LD.

The invention claimed is:

1. A method for producing a rare earth aluminate fluorescent material, comprising:
preparing, as raw materials, cerium oxide having a crystallite diameter in a range of 200 Å or more and 1,600 Å or less, a compound containing at least one kind of a rare earth element Ln selected from the group consisting of Y, La, Lu, Gd, and Tb, a compound containing Al, and a compound containing at least one kind of an element M1 selected from the group consisting of Ga and Sc,
wherein a total molar ratio of the rare earth element Ln and cerium is 3, a total molar ratio of Al and the element M1 is a product of a parameter k in a range of 0.95 or more and 1.05 or less and 5, a molar ratio of cerium is a product of a parameter n in a range of 0.005 or more and 0.050 or less and 3, and a molar ratio of the element M1 is a product of a parameter m in a range of more than 0 and 0.02 or less, 5, and the parameter k; and
subjecting a mixture of the raw materials to a heat treatment to provide a calcined product.

2. The method for producing a rare earth aluminate fluorescent material according to claim 1, wherein the crystallite diameter of the cerium oxide is in a range of 200 Å or more and 1,550 Å or less.

3. The method for producing a rare earth aluminate fluorescent material according to claim 1, wherein the cerium oxide having a crystallite diameter in a range of 200 Å or more and 1,600 Å or less has been subjected to a preheat treatment in a temperature range of 700° C. or more and 1,300° C. or less.

4. The method for producing a rare earth aluminate fluorescent material according to claim 3, wherein the temperature of the preheat treatment is in a range of 800° C. or more and 1,000° C. or less.

5. The method for producing a rare earth aluminate fluorescent material according to claim 1, wherein the cerium oxide has a BET specific surface area in a range of 4.2 m²/g or more and 130 m²/g or less.

6. The method for producing a rare earth aluminate fluorescent material according to claim 1, wherein the resulting rare earth aluminate fluorescent material has a composition represented by the following formula (I):

$$(Ln_{1-n}Ce_n)_3(Al_{1-m}M1_m)_{5k}O_{12} \quad (I)$$

wherein Ln represents at least one kind of a rare earth element selected from the group consisting of Y, La, Lu, Gd, and Tb; M1 represents at least one kind of an element selected from the group consisting of Ga and Sc; and k, m, and n each satisfy 0.95≤k≤1.05, 0≤m≤0.02, and 0.005≤n≤0.050.

7. A rare earth aluminate fluorescent material having a composition containing at least one kind of a rare earth element Ln selected from the group consisting of Y, La, Lu, Gd, and Tb; Ce; Al; 0; and at least one kind of an element M1 selected from the group consisting of Ga and Sc, wherein a total molar ratio of the rare earth element Ln and Ce is 3, a molar ratio of Ce is a product of a parameter n in a range of 0.005 or more and 0.050 or less and 3, a total molar ratio of Al and the element M1 is a product of a parameter k in a range of 0.95 or more and 1.05 or less and 5, a molar ratio of the element M1 is a product of a parameter m in a range of more than 0 and 0.02 or less, the parameter k, and 5, and a molar ratio of O is 12, in 1 mol of the composition, and
wherein the rare earth aluminate fluorescent material has an average particle diameter Db measured by a Fisher sub-sieve sizer method in a range of 22 μm or more and 50 μm or less, and has an average circle equivalent diameter De in a range of 26 μm or more and 45 μm or less.

8. The rare earth aluminate fluorescent material according to claim 7, wherein the rare earth aluminate fluorescent material has a composition represented by the following formula (I):

$$(Ln_{1-n}Ce_n)_3(Al_{1-m}M1_m)_{5k}O_{12} \quad (I)$$

wherein Ln represents at least one kind of a rare earth element selected from the group consisting of Y, La, Lu, Gd, and Tb; M1 represents at least one kind of an element selected from the group consisting of Ga and Sc; and k, m, and n each satisfy 0.95≤k≤1.05, 0≤m≤0.02, and 0.005≤n≤0.050.

9. The rare earth aluminate fluorescent material according to claim 7, wherein the rare earth aluminate fluorescent material has an average particle area Ap in a range of 500 μm² or more and 3,000 μm² or less.

10. The rare earth aluminate fluorescent material according to claim 7, wherein the average circle equivalent diameter De of the rare earth aluminate fluorescent material is in a range of 27 μm or more and 42 μm or less.

11. A light emitting device comprising the rare earth aluminate fluorescent material according to claim 7, and a light emitting element having a light emission peak wavelength in a range of 380 nm or more and 485 nm or less.

12. The light emitting device according to claim 11, wherein the light emitting element is a semiconductor laser.

* * * * *